United States Patent [19]

Gibson

[11] Patent Number: 4,463,294
[45] Date of Patent: Jul. 31, 1984

[54] WINDSHIELD WIPER CONTROL APPARATUS

[76] Inventor: Paul N. Gibson, Rte. 1, Box 239, Saluda, S.C. 29138

[21] Appl. No.: 478,908

[22] Filed: Mar. 25, 1983

[51] Int. Cl.³ .............................................. H02P 5/32
[52] U.S. Cl. .................... 318/313; 318/443; 318/444; 318/480; 318/483
[58] Field of Search ............... 318/280, 483, 313, 480, 318/444, 466, 443, DIG. 2; 324/58.5 B; 315/77, 82; 200/61.05; 15/250.17, 250 C, 250.12; 250/338, 341

[56] References Cited

U.S. PATENT DOCUMENTS 3,411,005  1/1966  Taylor .................................. 250/338
4,207,466  6/1980  Drage et al. ......................... 250/338
4,317,073  2/1982  Blaszkowski ................. 15/250 C X Primary Examiner—B. Dobeck
Assistant Examiner—Bentsu Ro
Attorney, Agent, or Firm—Dority & Flint

[57] ABSTRACT

A control circuit for a windshield wiper motor which utilizes a plurality of infrared emitters that emit a chain of infrared pulses towards a plurality of infrared sensors. When rain passes between the infrared emitters and the infrared sensors, it will interrupt the flow of pulses therebetween. A control circuit senses the missed pulses and selectively energizes a low-speed, mid-speed and high-speed winding associated with the wiper motor for varying the speed of the windshield wipers. The device automatically controls the operation of the windshield wipers of a vehicle.

8 Claims, 3 Drawing Figures

WINDSHIELD WIPER CONTROL APPARATUS

BACKGROUND OF THE INVENTION

Heretofore on most automobiles and vehicles, the operation of windshield wipers is normally by manually switching them on and off. Furthermore, the controls normally require manually switching between the various settings for varying the speed of operation for the wiper. While in many instances such is a satisfactory mode of operation, oftentimes, the operator of the vehicle will forget to change the speed of operation of the wiper when the intensity of the rain changes or stops.

The above systems heretofore used in vehicles require the operator's personal attention each time a change in the operation of the wipers is required.

Attempts have been made to provide automatic control apparatus for controlling the operation of the windshield wipers. One such system is disclosed in U.S. Pat. No. 4,355,271 wherein an infrared radiating device directs infrared radiation from the interior of the vehicle through the wind screen to be reflected from the outer surface of the wind screen back into the vehicle where it is detected by a detector. The apparatus is responsive to variations in infrared radiation incident upon the detector to control the wiper apparatus to set the vehicle wipers in operation when dust or water is detected on the wind screen. One apparent problem with such a device is that it can be triggered by dust as well as rain.

Another windshield wiper control is disclosed in U.S. Pat. No. 4,317,073 wherein a plurality of sensors, which are activated in response to various degrees of moisture precipitation or rain, are used to start and stop the wiper mechanism associated with a windshield wiper and also to operate it intermittently and at a low or high speed in accordance with the degree of rain or moisture of precipitation. Typical moisture sensors utilized with such an apparatus are optical sensors or thermistors. The patent also teaches the use of electrode type sensors.

Examples of other systems for automatically controlling the operation of a windshield wiper motor are disclosed in U.S. Pat. Nos. 3,786,330—3,826,979—4,131,834—4,010,383—4,339,698—3,649,898, and British Pat. No. 1,101,441 granted on Jan. 31, 1968.

SUMMARY OF THE INVENTION

The apparatus constructed in accordance with the present invention includes a system for automatically controlling the operation of a motor windshield wiper of a vehicle responsive to the intensity of the rain striking the vehicle. The apparatus includes a rain sensor which is carried on the exterior of the vehicle. The sensor includes a housing with a plurality of infrared emitters carried on one side thereof. A plurality of infrared sensors are carried on the other side of the housing and spaced from the infrared emitters. The housing is positioned so that rain can pass between the emitters and sensors when the vehicle is being driven. An oscillator is used for supplying a signal of a predetermined frequency which, in one particular embodiment, is a one kilohertz signal to the plurality of infrared emitters causing the emitters to generate infrared signals of the predetermined frequency. The infrared sensors are connected in series and each sensor will receive the infrared signal being generated by a particular emitter unless rain passes between the emitter and sensor. When such occurs, there is a missed pulse. A plurality of control circuit means are connected to the sensors for measuring the frequency of the infrared signals received by the infrared sensors and activating the motor of the windshield wiper, causing such to be operated at a speed depending on the intensity of the rain.

As previously mentioned, in one particular system, the predetermined frequency is a one kilohertz signal, and the control circuit means includes timers which time out responsive to missed pulses occurring when raindrops pass between the emitters and the sensors.

Accordingly, it is an important object of the present invention to provide a circuit for automatically controlling the operation of a windshield wiper.

Still another important object of the present invention is to provide an apparatus which utilizes a chain of infrared signals that are interrupted responsive to rain for controlling the operation of a windshield wiper.

Still another important object of the present invention is to provide a simple and reliable device for detecting the intensity of the rain and controlling the operation of a windshield system.

These and other object and advantages of the present invention will become more readily apparent upon reading the following specification and by reference to the accompanying drawings forming a part thereof, wherein an example of the invention is shown and wherein:

DESCRIPTION OF A PREFERRED EMBODIMENT

Figure 1:
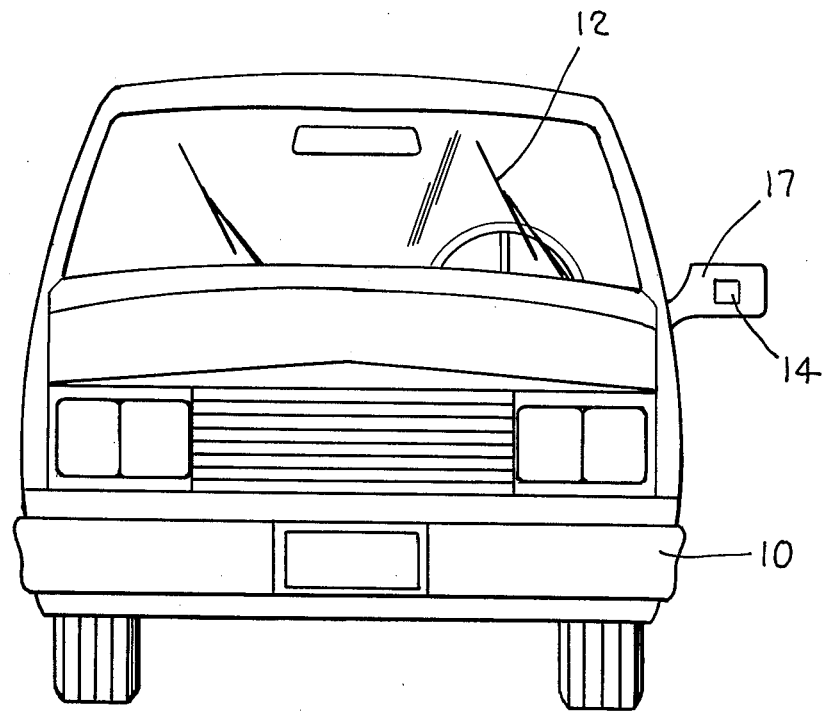
FIG. 1 is an elevational view showing a vehicle having a sensor mounted on a front surface of an exterior mirror for controlling the operation of a windshield wiper.

Referring to FIG. 1, there is illustrated a conventional vehicle 10 which, in this particular embodiment, takes the form of a van which is provided with conventional motor-operated windshield wipers 12. The operation of the windshield wipers 12 are controlled by a sensor carried in a rectangularly shaped housing 14 which is mounted on the front side of an exterior mirror 17. The housing 14 is substantially rectangular in shape and has a substantially square opening 16 provided in the middle thereof. The opening is surrounded by interior walls 18 and 20 that are joined by a top 22 and bottom wall 24. Positioned in the side wall 18 are a plurality of infrared emitters 26 which, when activated, generate an infrared signal of a predetermined frequency. These infrared signals are transmitted directly across the square-shaped opening 16 to a plurality of infrared sensors 28.

If raindrops pass through the opening 16 between the emitters 26 and sensors 28, it will cause the sensors 28 to miss pulses. These missed pulses, in turn, are used for controlling the operation of a control circuit for automatically operating a low-speed winding 30, an intermediate speed winding 32, or a high-speed winding 34 of the windshield wiper motor. Accordingly, the speed of operation of the windshield wiper motor will vary with the intensity of the rain.

As a result of the sensor 14 being positioned on the front surface of the mirror 17, all road and weather conditions are automatically compensated for. One example of this is that after rain has ceased and the pavement is still wet, when meeting or passing another vehicle, water from the pavement is often flung onto the windshield, temporarily obstructing the driver's vision requiring him to remove his eyes from road to initiate an action to clear the windshield. With the system constructed in accordance with the present invention, this action is automatically initiated.

While on many automobiles presently on the road there is a delay action wiper system that is manually set by the driver to wipe the windshield at selective intervals regardless of rain conditions, the system constructed in accordance with the present invention only operates when needed. As soon as the rain ceases, the wipers automatically turn off after a suitable delay to clear the windshield.

Figure 3:
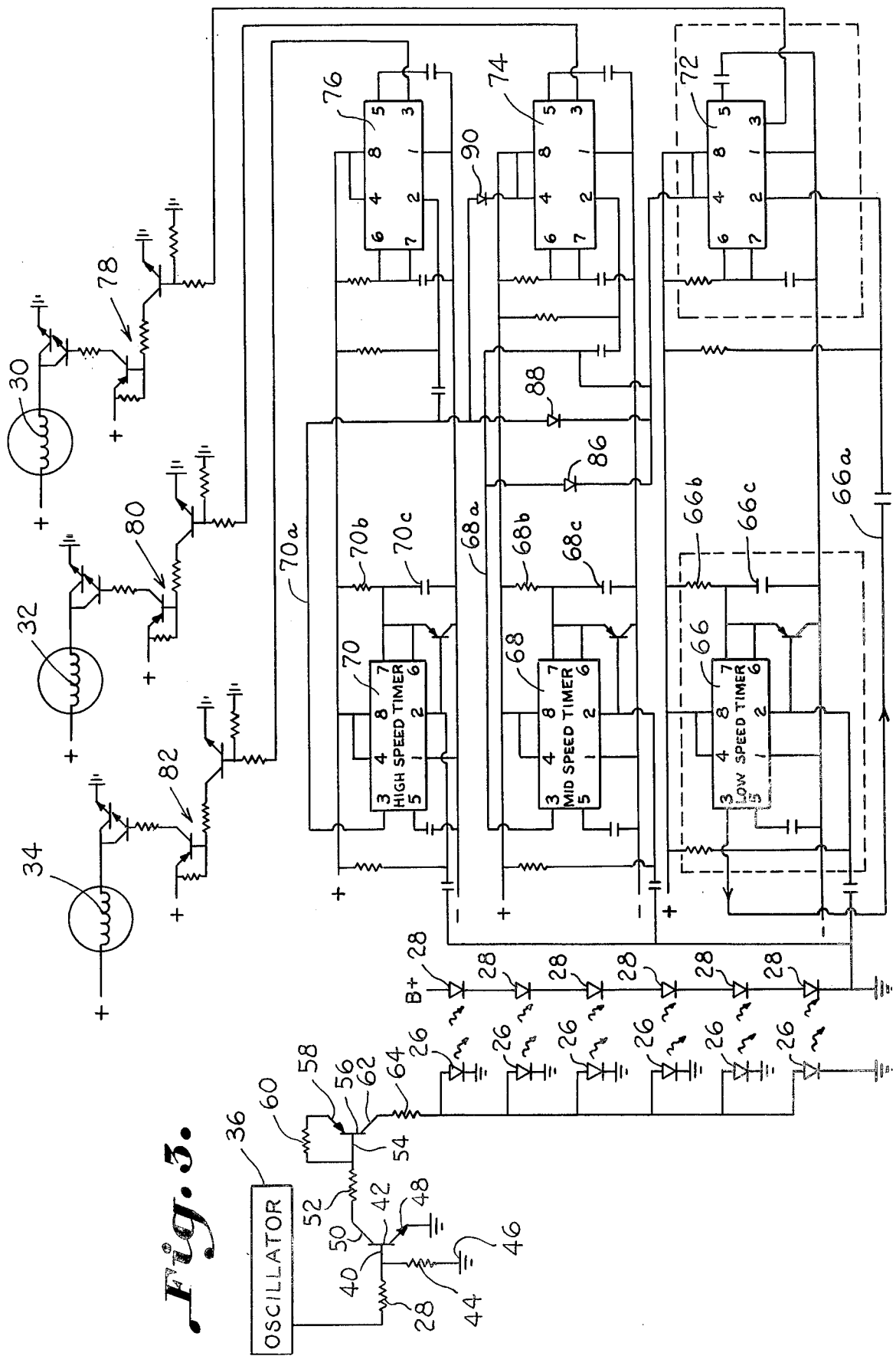
FIG. 3 is a schematic diagram showing the electric circuit associated with the apparatus for controlling the operation of a windshield motor.

Referring to FIG. 3 of the drawing, there is shown an oscillator 36 which generates a one kilohertz signal that is fed through a resistor 28 to a base electrode 40 of a NPN transistor 42. The base electrode 40 is also connected through resistor 44 to ground 46. An emitter electrode 48 of the transistor is also connected to ground. A collector electrode 50 is connected through a resistor 52 to a base electrode 54 of a PNP transistor 56. An emitter electrode 58 of the PNP transistor 56 is connected through a resistor 60 back to the base electrode 54.

A collector electrode 62 is, in turn, connected through a resistor 64 to each of the infrared emitters 26 which are connected in parallel. The circuit which includes the NPN transistor 42 and the PNP transistor 56 is a driver circuit which drives the infrared emitters 26 responsive to the signal received from the oscillator 36 to produce a modulated infrared beam which is modulated at a thousand hertz that is under control of the oscillator 18. Of course any suitable drive and oscillator arrangement can be used for the infrared emitters.

As previously mentioned, directly opposite each of the infrared emitters 26 is an infrared sensor 28. The infrared sensors 28 are connected in series with one end being connected to a B+ voltage. When raindrops pass between a particular infrared emitter 26 and a sensor 28, the modulated signal being emitted by the infrared emitter 26 will be interrupted. When it is interrupted, there is no infrared signal received by the respective infrared sensor 28 and, accordingly, the B+ is disconnected from a trigger terminal 2 of the timers 66, 68 and 70. The timers 66, 68 and 70 are conventional timers generally referred to in the industry as LM 555 timers. One suitable timer is manufactured by Signetics of Sunnyvale, Calif. These timers produce an output signal on their respective output leads 66a, 68a and 70a, if the trigger pulse is not received on terminal 2 within a predetermined period of time. This predetermined period of time is under control of a resistor 66b and a capacitor 66c. Similar resistors and capacitors 68b and 68c are associated with the mid-speed timer 68 and the high-speed timer 70. Therefore, when setting the low speed timer 66, the mid-speed timer 68 and the high-speed timer 70, the resistors and capacitors associated with these timers should be selected so that the low-speed timer will be activated when the intensity of the rain is least. At such time, there is less interruption of the pulse chain being emitted by the infrared emitters 26 and received by the infrared sensors 28 than is the case when it is desired to activate either the mid-speed timers and the high-speed timers.

When it begins to rain, the drops pass between the emitters 26 and sensors 28 causing slightly less than 1,000 pulses to be received or, expressed differently, there will be a gap in the kilohertz pulse chain. This gap in the pulses or missed number of pulses triggers the low-speed timer causing an output signal to be applied to the output lead 66a and fed to a trigger terminal 2 of another delay timer 72. The output of the mid-speed timer 68 and high-speed timer 70 are connected through similar delay timers 74 and 76. The purpose of the delay timers 72, 74 and 76 is to hold or latch onto the signal coming from the output of the low-speed, mid-speed and high-speed timers 66, 68 and 70 to keep the windings 30, 32 and 34 energized for a predetermined period of time responsive to receiving a signal. In one particular incident, this may be for approximately three (3) seconds. This is to ensure smooth operation of the windshield wiper motor. The delay timers 72, 74 and 76 are also conventional delay timers. Of course, any suitable timers and delay timers could be used in the circuit.

Going back to the operation of the low-speed timer 66, it is used for energizing a low-speed winding 30 of the wiper motor through a Darlington circuit 78. Similar Darlington circuits 80 and 82 are connected between the output terminals of the mid-speed delay timer 74 and high-speed delay timer 76.

As the intensity of the rain increases, the number of missed pulses will increase and after they increase to a certain level, they will activate the mid-speed timers 68 and upon increasing still further will activate the high-speed timer 70. It is noted that the output of mid-speed timer 68 is connected through lead 68a back through a diode 86 to a reset terminal 4 of the delay timer 72 to deactivate the delay timer connected to the low-speed winding 30. Similarly, the output 70a of the high-speed timer is connected through a diode 88 to a reset terminal 4 of the low-speed timer and a diode 90 to the reset terminal 4 of the mid-speed timer. Thus, only one winding associated with the wiper motor operates at a time.

While the wiper motor shown in the preferred embodiment includes three windings 30, 32 and 34 for controlling the speed of operation of the windshield wiper, it is to be understood that the missed pulses produced by the sensors 28 could be used to control and vary the voltage to one winding of a windshield wiper motor to vary the speed of operation of the windshield wiper motor responsive to the missed pulses.

Figure 2:
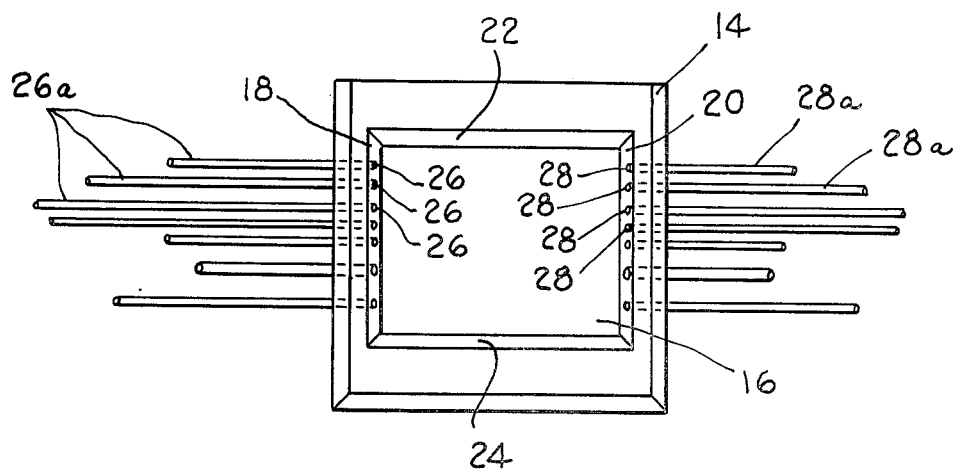
FIG. 2 is an enlarged perspective view of a sensor forming part of the apparatus of FIG. 1.

It is also to be understood that the leads 26a and 28a, shown in FIG. 2, could be bundles of fiber optics with the infrared emitter being connected to a remote end of the bundles 26a and the infrared sensors connected to the remote ends of the infrared sensors 28a and only the ends of the fiber optic cables extending into the side walls 18 and 20.

While the sensor housing 14 is shown mounted on the front side of a mirror 17, it is to be understood that it can be mounted on any convenient place on the vehicle as long as it is exposed to oncoming rain. When it is mounted on the front side of the mirror, there must be sufficient space between the front side of the mirror and the bottom of the housing to allow the rain drops to pass therethrough. If it is found that the drops bounced back off of the front side of the mirror, then it can be adjusted outwardly therefrom by any suitable means.

While a preferred embodiment of the invention has been described using specific terms, such description is for illustrative purposes only, and it is to be understood that changes and variations may be made without departing from the spirit or scope of the following claims.

What is claimed is:

1. An apparatus for automatically controlling the operation of a motor for a windshield wiper of a vehicle responsive to the intensity of rain striking said vehicle comprising:
   a rain sensor carried on the exterior of said said vehicle;
   (i) a housing;
   (ii) a plurality of infrared emitters carried on one side of said housing;
   (iii) a plurality of infrared sensors carried by said housing and being spaced from said infrared emitters;
   (iv) said housing being positioned for allowing rain to pass between said emitters and sensors;
   means for supplying a signal of a predetermined frequency to said plurality of infrared emitters causing said emitters to generate infrared signals of a predetermined frequency;
   a plurality of control circuit means for energizing said motor at different speeds upon being activated;
   means electrically connected to said sensors for measuring the frequency of said infrared signals received by said infrared sensors and activating one of said control circuit means depending on the intensity of the rain passing between said infrared emitters and infrared sensors for controlling the speed of operation of said wipers.

2. The apparatus as set forth in claim 1 further comprising:
   said plurality of infrared emitters being connected in parallel;
   said means for supplying a signal of predetermined frequency being an oscillator.

3. The apparatus as set forth in claim 1 further comprising:
   said signal of a predetermined frequency being a pulse chain of predetermined frequency;
   a source of positive potential;
   said plurality of infrared sensors being connected in series between said positive potential and said plurality of control circuit means so that when any one of said infrared sensors fails to sense a pulse of said pulse chain being emitted by said infrared emitters a missed pulse signal is imparted to said control circuit means, each said control circuit means being activated upon receiving a predetermined number of missed pulses.

4. The apparatus as set forth in claim 3 further comprising:
   said plurality of circuit means each including an electronic timer means which times out and generates a signal if no pulses appear on a trigger terminal for a predetermined period of time.

5. The apparatus as set forth in claim 4 further comprising:
   each of said plurality of circuit means being set to time out at different predetermined periods of time.

6. The apparatus as set forth in claim 3 further comprising:
   said motor for said windshield wiper having low speed, medium speed and high speed windings each of which is electrically connected to a respective control circuit means for driving said windshield wiper at different speeds upon being energized.

7. The apparatus of claim 4 further comprising:
   a delay timer means interposed between electronic timer means and said motor for said windshield wiper energizing said motor for a predetermined period of time after receiving said signal from said electronic timer means.

8. The apparatus as set forth in claim 1 further comprising:
   a fiber bundle coupled to the output of each said infrared emitters projecting said infrared signal towards said sensors, and
   a fiber optic receiver connected to each said sensor for receiving said infrared signals and supplying said infrared signal to said respective sensors.

* * * * *